United States Patent Office 3,518,907
Patented July 7, 1970

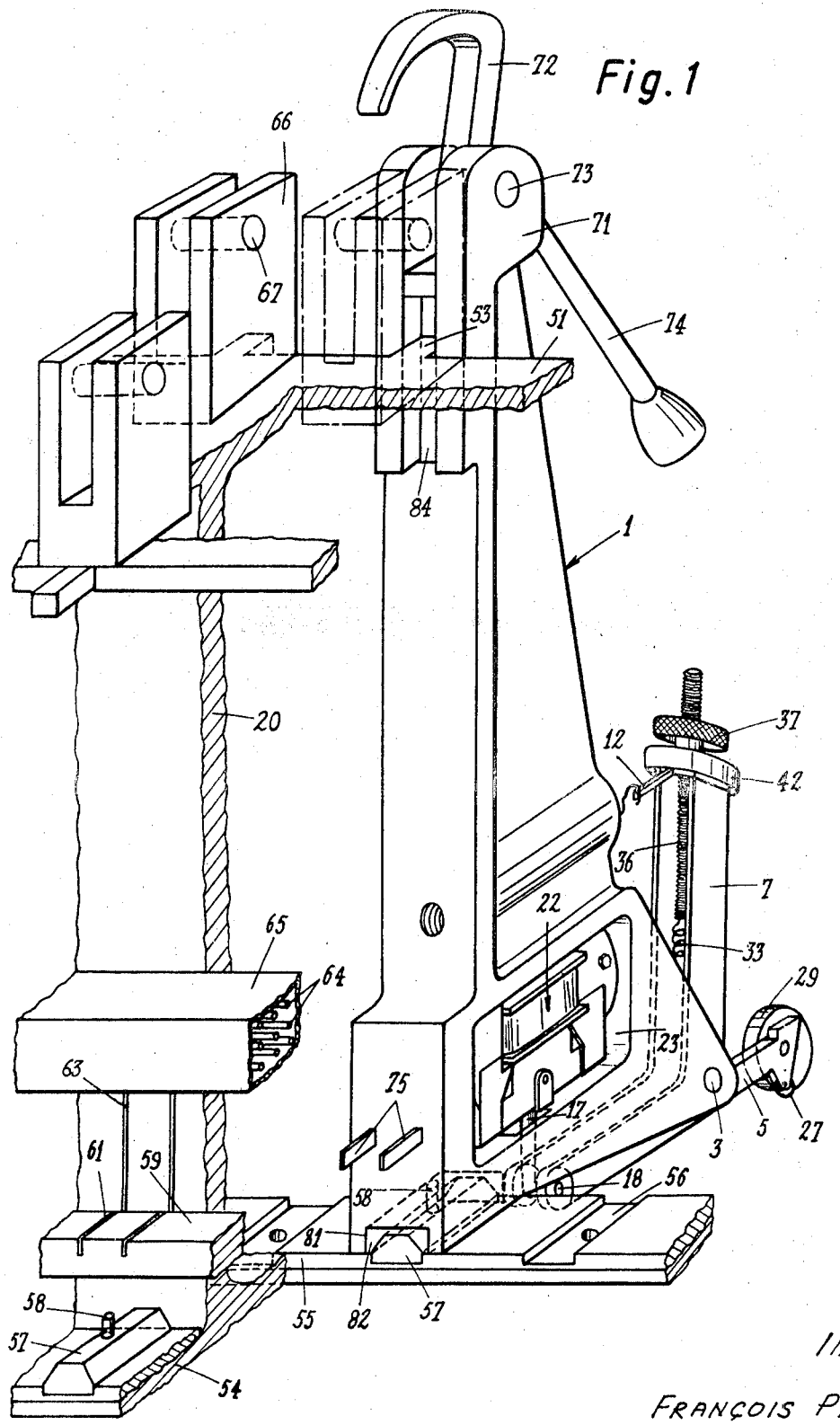

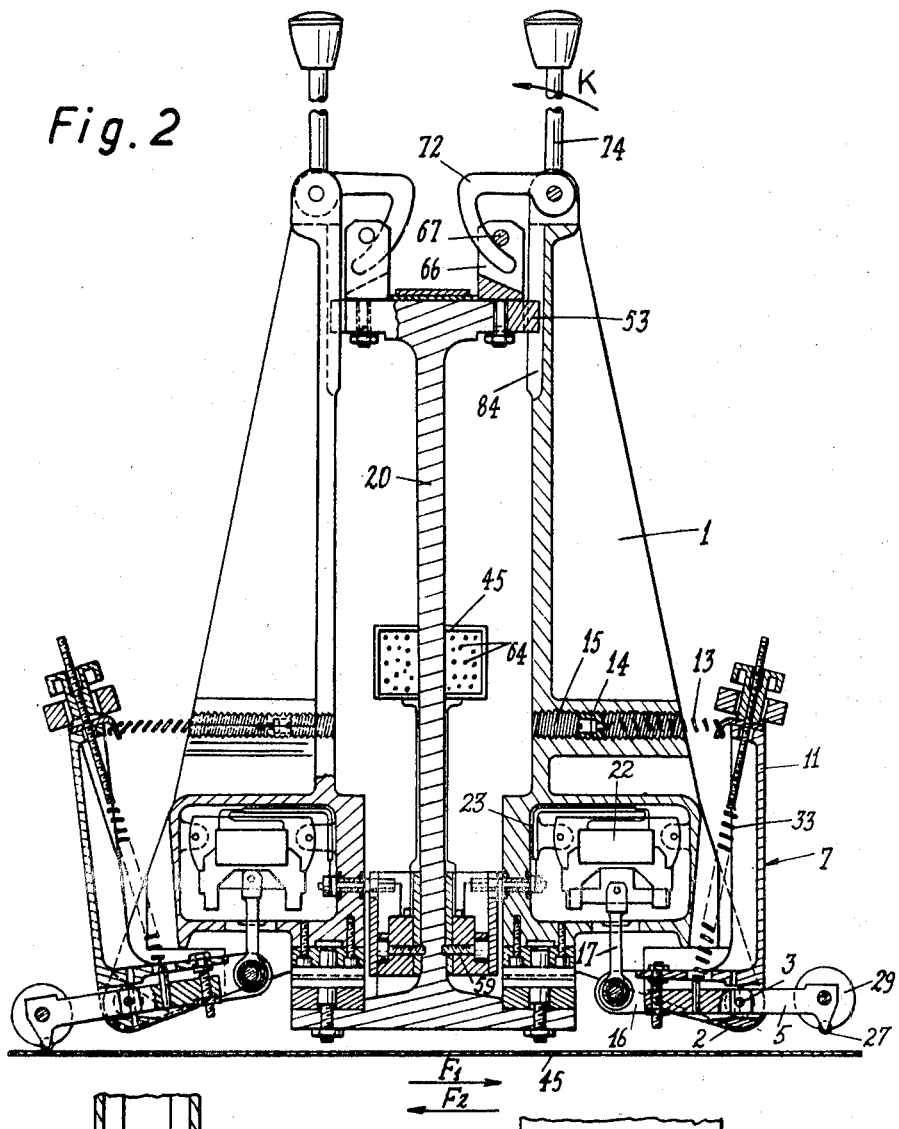
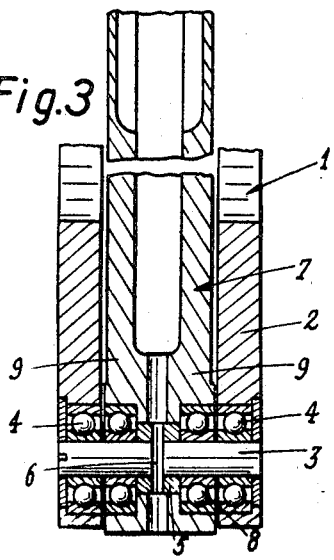
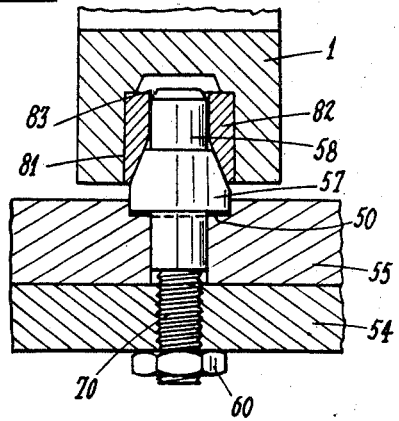

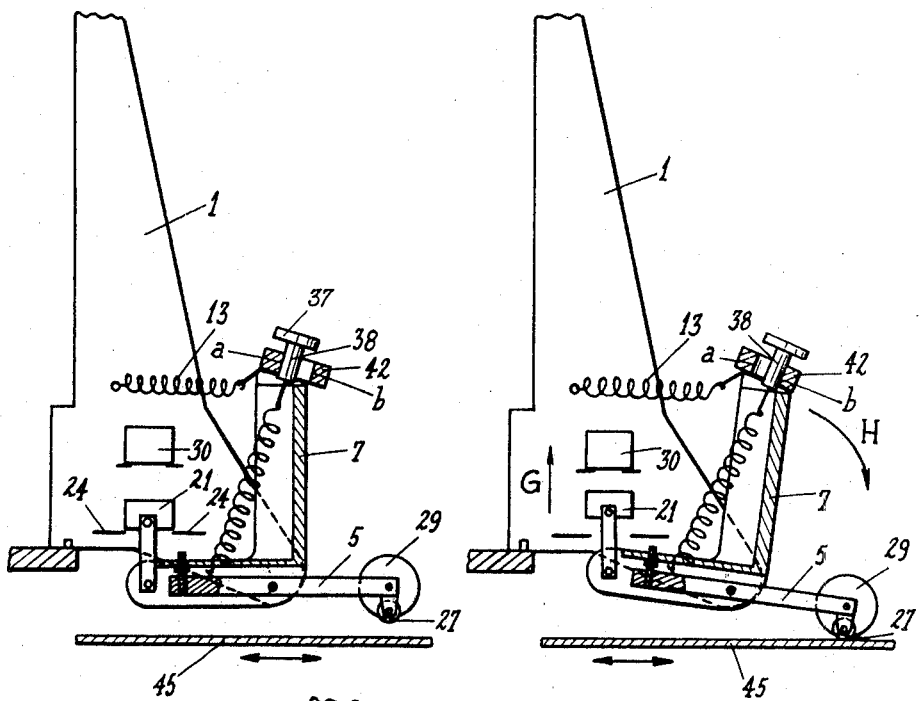
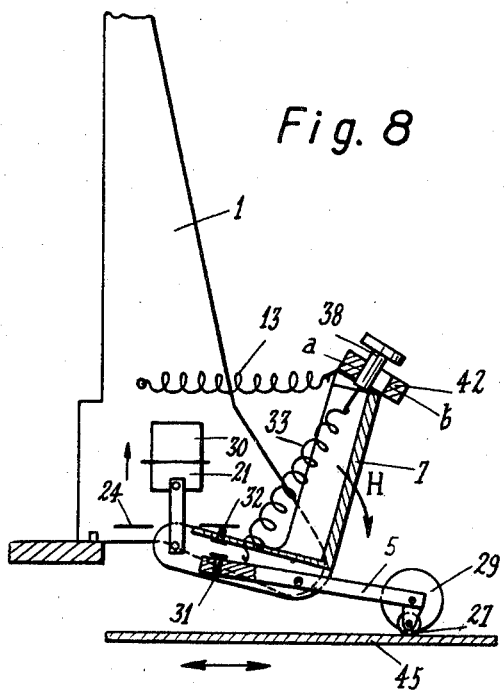

3,518,907
GLASS-CUTTING MACHINE
Francois Pinel, Maubeuge, France, assignor to Boussois Souchon Neuvesel, Paris, France, a French company
Filed Mar. 21, 1968, Ser. No. 714,986
Claims priority, application France, Apr. 14, 1967, 102,772
Int. Cl. B26d 3/08, 5/08
U.S. Cl. 83—12                                                        15 Claims

ABSTRACT OF THE DISCLOSURE

A machine for cutting sheet-glass comprising a wheel-carrier frame on which is pivotally mounted a tool-holder lever which is urged elastically towards a stop position and an electromagnetic control system for actuating said tool-holder lever. The wheel-carrier frame carries a rocker-arm bracket which is pivotally mounted coaxially with said tool-holder lever and urged elastically towards a stop position defined with respect to said wheel-carrier frame. The tool-holder lever is in turn urged elastically towards a stop position defined with respect to said rocker-arm bracket which is subjected to the action of said electromagnetic control system.

---

This invention relates to an improved machine for cutting glass and like products in sheet form. It will be recalled that glass-cutting consists in the use of a cutting-wheel for the purpose of scoring the glass sheet which can then be broken along the line thus marked.

The cutting machine in accordance with the invention is primarily intended to be mounted transversely on a gantry or portal frame together with a number of similar machines for forming a series of parallel cutting lines on the glass sheet.

In a fairly large number of known cutting machines of this type, the cutting-wheel is mounted on a tool-holder which is capable of displacement relative to a stationary support and a remote-control system is provided for the purpose of displacing the tool-holder with respect to the glass.

The control system referred to can be either electropneumatic or electromagnetic.

Cutting tools of the electropneumatic control type have a response time which is fairly long and irregular and are suitable in practice only for edge-to-edge cutting.

Electromagnetically-controlled tools of the type in current use are equipped with windings provided with a conical plunger-core and call for direct-current supply but have a response time which is both short and uniform.

The cutting machines with electromagnetic control which are employed at the present time can be divided into two classes depending on whether application of pressure is carried out by electromagnetics with upward return by spring action or conversely.

In the first class, the approach of the tool to the glass sheet is perpendicular to the glass. The need to reduce the impact leads to the use of two different electric voltages, namely a low voltage for tool approach and a high voltage for application of pressure. Adjustment of the pressure as a function of wear of the cutting-wheel makes it necessary to regulate the voltage. Attempts have been made to avoid this requirement by equipping the tool with a feeler carriage whose runner-wheels are continuously in contact with the glass during the cutting operation and limit the penetration of the cutting-wheel at the time of engagement with the work.

In the second class, the cutting-wheels are fixed at one of the extremities of a lever, the other extremity of which is the point of attachment of an adjustable pressure-application spring. The fulcrum-pin of the lever is fixed on a column which is usually held against a bottom stop by means of a powerful spring. The machine is fixed on a portal frame in such a manner as to ensure that the cutting-wheel presses on the glass by virtue of the pressure-application spring when the column is located in the bottom position. The electromagnet then has the function of raising the cutting-wheel to a height of a few millimeters when the glass does not have to be cut. The tool approach is not perpendicular to the glass and takes place when the supply current is cut off in the control winding. In order that the current need not be maintained in a tool which is inoperative over a long period of time, provision is accordingly made for a manual lifting system whereby the column which had previously been maintained in the bottom position by the spring can be raised to an end-of-travel latch in opposition to the action of said spring.

These machines prove satisfactory on the whole but are complicated and costly to construct. Moreover, the overall transverse dimensions of such machines are substantial, which precludes their use in large numbers on the same portal frame. A further drawback is the fact that these tools cannot readily be replaced.

Consideration has to be given in addition to a whole series of desirable conditions which cannot be satisfied at the same time by means of the tools at present in use.

Electropneumatic tools have a response time which is not sufficiently short and, above all, which is not sufficiently constant.

From this point of view, electromagnetic tools are satisfactory. However, in the case of machines of the first class referred to above, the electric pressure-regulating system is not readily adaptable to a large number of tools which are subject to different degrees of wear. Furthermore, the numerous runner-wheels or rollers which are applied against the glass under high pressure are liable to encounter inevitable surface chips and this would result in damage to the glass.

In the case of machines of the second class, the fact of being obliged to maintain a large number of inoperative tools in the energized state is also an obstacle. Since the tool approach is not perpendicular to the glass, this machine can be employed only in respect of one direction of progression of the glass. This further complicates the problem of mounting of cutting machines on the portal frames.

The object of this invention is to overcome these different disadvantages by permitting the construction of a cutting machine with electromagnetic remote control which is of small overall size, which permits easy adjustment of the cutting-wheel pressure, which permits easy maintenance and replacement, and at the same time which provides a cutting line which is both accurate and of good quality.

In accordance with the invention, the machine for cutting sheet-glass which comprises a wheel-carrier frame on which is pivotally mounted a tool-holder lever which is urged elastically towards a stop position and an electromagnetic control system for actuating said tool-holder lever, is characterized in that the wheel-carrier frame carries a rocker-arm bracket which is pivotally mounted coaxially with said tool-holder lever and urged elastically towards a stop position defined with respect to said wheel-carrier frame, the tool-holder lever being in turn urged elastically towards a stop position defined with respect to said rocker-arm bracket which is subjected to the action of said electromagnetic control system.

The double elastic connection provided on the one hand between the lever and the rocker-arm bracket and on the other hand between said bracket and the wheel-carrier frame in conjunction with the electromagnetic control of the rocker-arm bracket and the motion of the tool towards a position of abutting contact with the glass sheet before the electromagnetic control unit has reached the end of its travel makes it possible to obtain a relatively gentle contact of the tool with the glass followed by an application of pressure of said tool which is of controlled intensity and favorable to the cutting action.

In a preferred embodiment of the invention, the rocker-arm bracket consists of an L-shaped member which is pivotally mounted on the wheel-carrier frame in the vicinity of its apex; one of the arms of the L-shaped member is adapted to extend along the wheel-carrier frame and is returned towards this latter by a spring which is attached to the wheel-carrier frame whereas the other arm of the L-shaped member is connected by means of a link-arm to the moving core of the electromagnetic control system. As to the tool-holder lever, this latter is preferably fixed on a pin which is mounted in a yoke of the wheel-carrier frame, the rocker-arm bracket being in turn pivotally mounted on said pin by means of a yoke which is inserted between the yoke of the wheel-carrier frame and the tool-holder lever; in addition, said tool-holder lever is urged towards the rocker-arm bracket by an adjustable-tension restoring spring which is attached to one of the extremities of the rocker-arm bracket.

This combination of means makes it possible both to limit to an appreciable extent the lateral overall size of the machine, to derive the maximum benefit from the opposing actions of the restoring springs and of the electromagnetic control system and, finally, to obtain maximum precision for guiding the cutting tool, especially with a view to permitting engagement with the glass in a direction substantially perpendicular to its surface.

Preferably, the cutting tool is designed and arranged so as to constitute a removable self-contained unit which can either be placed in position or withdrawn from the support without any dismantling operations, whilst the connection and disconnection of circuits is carried out automatically.

Further particular features of the invention will become apparent from the description which follows hereinafter.

In the accompanying drawings, which are given solely by way of non-limitative example:

FIG. 1 is a view in perspective with parts broken away and showing a cutting machine in accordance with the invention which is assumed to be mounted on a supporting portal frame;

FIG. 2 is a view in elevation, and partly in cross-section showing two machines mounted on the portal frame, the machine shown on the right-hand side of the figure being in the inoperative position and the machine shown on the left-hand side being in action;

FIG. 3 is a view on a larger scale and in cross-section along the line III—III of FIG. 5;

FIG. 4 is a view on the same scale and in cross-section along the line IV—IV of FIG. 5;

FIGS. 6 to 8 are simplified explanatory diagrams on a smaller scale and in cross-section showing three particular positions of the machine.

Figure 5:
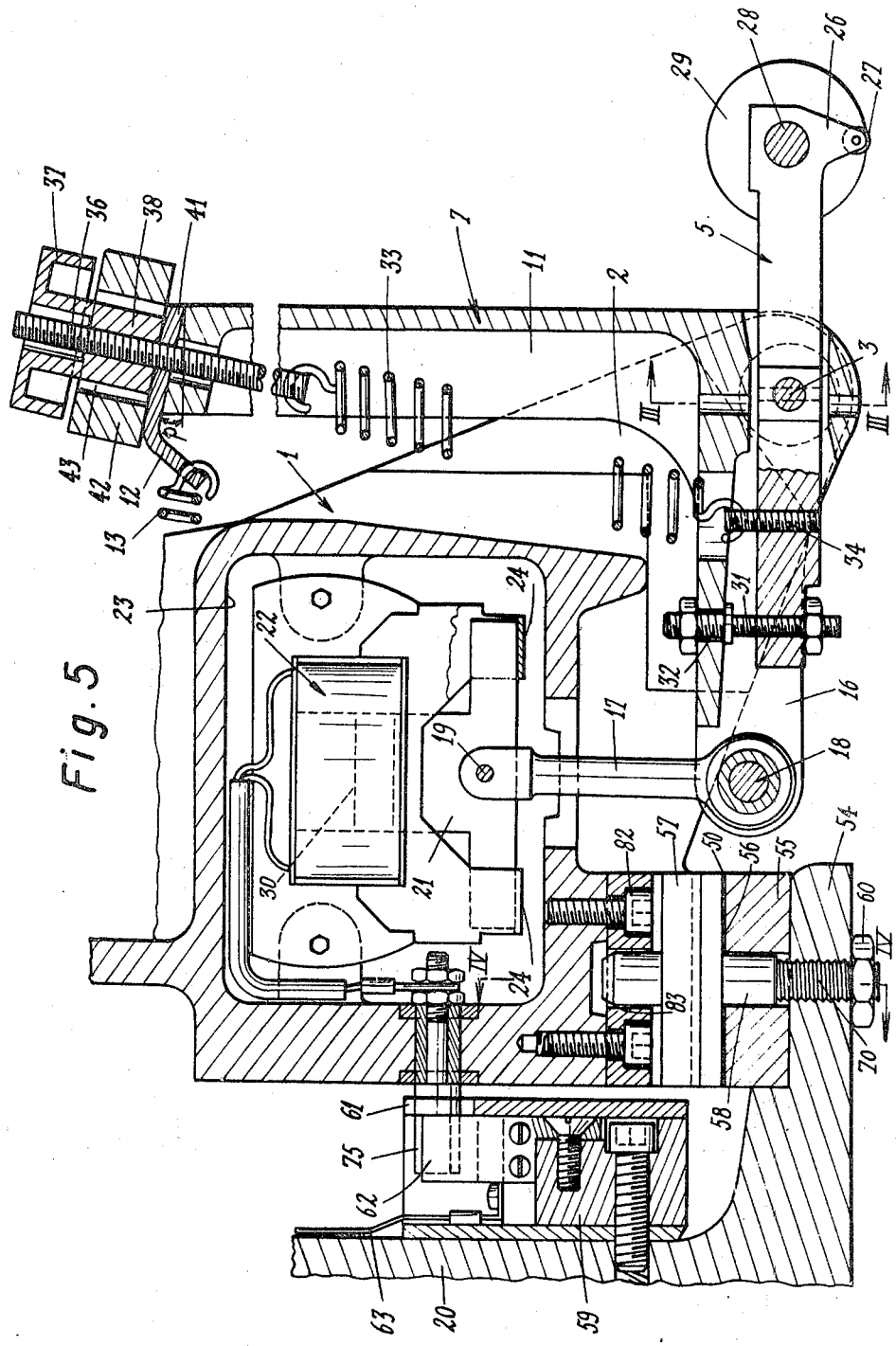
FIG. 5 is a view in cross-section with parts broken away and on a larger scale showing the lower portion of the machine.

In the particular embodiment of the invention which is described in reference to the accompanying drawings, the cutting machine essentially comprises a wheel-carrier frame 1 which is fitted with a number of different members for fixing and clamping said frame on a transverse gantry or portal frame 20, these means being described hereinafter.

The wheel-carrier frame 1 is constituted by a massive plate having a substantially triangular configuration, the acute angles of the triangle being very unequal. In the normal position of operation, the long side of the right-angle of the wheel-carrier frame 1 is disposed substantially vertically, the smallest acute angle being located at the top. At the opposite end, the wheel-carrier frame 1 constitutes a yoke 2, the cheeks of which are traversed by a pin 3 mounted by means of bearings 4 (as shown in FIG. 3). The pin 3 also passes through a tool-holder lever 5 which is secured thereto by means of a locking-pin 6.

A rocker-arm bracket 7 consisting of an L-shaped member is also pivotally mounted on the pin 3, the connection being provided by ball-bearings 8 inserted between the pin 3 and the cheeks of a yoke 9 of the rocker-arm bracket 7 which are disposed between the yoke 2 and the tool-holder lever 5.

The connection which is thus provided is such that the rocker-arm bracket 7 and the tool-holder lever 5 can pivot independently of each other relatively to the wheel-carrier frame 1.

One of the arms 11 of the rocker-arm bracket 7 extends vertically in substantially parallel relation to the long side of the wheel-carrier frame 1 and carries at the extremity thereof a screwed plate 41 terminating in a lug 12 to which is fastened a restoring spring 13, the other end of said spring being attached to a screw 14 which is fitted inside a transverse tapped hole 15 of the wheel-carrier frame 1. Positional adjustment of the screw 14 within said tapped hole 15 makes it possible to modify at will the tension of the restoring spring 13 which serves to maintain the rocker-arm bracket 7 at rest in an abutting position relatively to the wheel-carrier frame 1.

The other arm 16 of the rocker-arm bracket 7 extends in the rest position substantially horizontally between the cheeks of the yoke 2. Said arm 16 is coupled by means of a link-arm 17 to the electromagnet control system. The link-arm 17 is pivotally coupled to the arm 16 by means of a pin 18 and is pivotally coupled by means of a second pin 19 to the moving core 21 of an electromagnet 22 of the aforesaid control system, said electromagnet being mounted inside a housing 23 which is formed at the base of the wheel-carrier frame 1.

The electromagnet 22 and its moving core 21 can be of any known type. In the example under consideration, the core 21 has a T-shaped cross-section and, in the rest position, the arms of said core are maintained in abutting contact with non-magnetic stirrup-pieces 24 carried by the yoke of the electromagnet 22. The abutting contact of the core 21 against the stirrup-pieces 24 defines the rest position of the rocker-arm bracket 7, this latter being maintained in this position under the action of the spring 13.

The tool-holder lever 5 extends on each side of the pivot-pin 3. At one end, said lever projects relatively to the rocker-arm bracket 7 and has an elbowed extremity 26 on which the tool proper is rotatably mounted, said tool being constituted, for example, by a cutting-wheel 27 of tungsten carbide. The elbowed extremity 26 is traversed by a spindle 28 which permits the rotation of a runner-wheel 29 whose diameter is such that the cutting-wheel 27 projects slightly beyond the periphery of said runner-wheel.

It will be noted that the position of the cutting-wheel 27 is such that, in the rest position, the horizontal tangent plane at its lowest point is located only at a short distance from the horizontal tangent plane which passes through the pin 3 or pivotal axis which is common to the lever 5 and rocker-arm bracket 7.

At the end remote from the cutting-wheel 27, the lever 5 carries an adjustable stop 31 such as a screw fitted with a locking counter-nut. The stop 31 is urged by a restoring spring 33 towards a stationary stop 32 located on the opposite face of the arm 16 of the rocker-arm bracket 7. The spring 33 is attached at one end to a stud 34 of the lever 5 and at the other end to a threaded rod 36 on which is screwed a tension-regulating nut 37. The nut 37 has a cylindrical body 38 which is applied against the oblique plate 41 of the arm 11. An annular weight-head 42, the intended function of which will be explained hereinafter, is freely mounted around the cylindrical body 38 of the nut 37. The weight-head 42 is provided with an internal bore 43 whose diameter is larger than that of the cylindrical body 38 of the nut 37, with the result that the weight-head 42 is capable of radial displacement in all directions with respect to this latter.

It is to be noted that, in the rest position, the plate 41 makes an angle $p$ with the horizontal which is established by design. It is also ensured that the frictional contact between the underface of the weight-head 42 and the plate 41 which serves as a bearing member for this latter is as small as possible. The result thereby achieved is that, in the rest position, the weight-head 42 has a tendency to move to an advanced position towards the exterior, as shown in FIG. 6.

The elastic restoring systems of the rocker-arm bracket 7 and of the lever 5 are so designed that the moment of restoring of the lever 5 towards its position of abutment against the rocker-arm bracket 7 is substantially greater than the moment of restoring of the rocker-arm bracket 7 towards its position of abutment with respect to the wheel-carrier frame 1. On the other hand, the machine is mounted in such a manner that, in the rest position, the electromagnet 22 is not energized, only one voltage being provided for the energization of the electromagnet.

During operation, the glass sheet 45 is located beneath the cutting-wheel 27 and at a small distance from this latter. The sheet 45 is endowed with a relative and continuous translational motion with respect to the cutting-wheel 27 at right angles to the axis of this latter. The sheet can move indifferently in direction $F_1$ or in direction $F_2$, which is in any case a first advantage of the machine according to the invention.

In the description relating to the operation of the machine, a distinction will be drawn for the sake of enhanced clarity between, on the one hand, the function of the control system and connecting members and, on the other hand, the weight-head 42.

When electric current is delivered into the winding of the electromagnet 22, the moving core 21 is attracted in the direction of the arrow G (as shown in FIG. 7) towards the fixed core 30 of the electromagnet 22. The tractive force which is thus exerted on the link-arm 17 causes the rocker-arm bracket 7 to pivot about the pin 3 in the direction of the arrow H and thus produces the extension of the restoring spring 13.

In the first part of the movement, the cutting-wheel 27 is applied against the glass sheet 45, the lever 5 being associated with the rocker-arm bracket 7.

In the second part of the movement, the force of attraction of the core 30 on the core 21 increases progressively as this latter moves closer, the link-arm 17 is still subjected to tractive force and the rocker-arm bracket 7 therefore continues to rotate. However, since the cutting-wheel 27 is in abutment against the glass sheet 45, the lever 5 is no longer able to pivot. In consequence, the rocker-arm bracket 7 will pivot with respect to said lever and continue to rotate in the direction of the arrow H. Under these conditions, the stop 31 moves away from the stationary stop 32 (as shown in FIG. 8). The relatve pivotal movement of the members 5 and 7 produces the movement of extension of the restoring spring 33. Consequently, the moment which is transmitted to the lever 5 and which ensures the penetration of the cutting-wheel 27 into the glass is increased.

The pivotal movement of the rocker-arm bracket 7 continues until the core 21 has come into contact with the fixed core 30 (in the position shown in FIG. 8) and it is in this position that the cutting of the sheet 45 is carried out. Any surface irregularities of the glass are compensated for by the movement of the spring 33 which permits the relative pivotal movement of the lever 5 with respect to the rocker-arm bracket 7.

The threaded rod 36 and the nut 37 serve to regulate the pressure which is transmitted by the lever 5 to the cutting-wheel 27 as a function of the state of wear of this latter. In addition, the arrangement adopted makes it possible to regulate the depth of the cutting line during operation of the machine.

Under normal operating conditions, the runner-wheel 29 does not come into contact with the sheet 45 but produces action only at the end of a sheet. Thus, the cutting-wheel 27 is prevented from cutting directly into the edge of the glass as this might otherwise result in chipping or even in damage to the cutting-wheel 27.

When the supply of current to the electromagnet 22 is cut off, the springs 13 and 33 return the wheel-carrier frame 1 and lever 5 to the inoperative position of FIG. 6 in which the core 21 is applied against the stirrup-pieces 24.

The cycle of operation described above is facilitated to a considerable extent by the action of the weight-head 42 which produces a number of important technical effects.

In the inoperative condition, as has been indicated earlier, the weight-head 42 projects outwards from the arm 7 (position of FIG. 6) and is applied along its generator-line $a$ against the cylindrical body 38 of the nut 37. When the electromagnet 22 is energized, the abrupt pivotal movement of the rocker-arm bracket 7 in the direction of the arrow H does not initially produce the movement of the weight-head 42 and this latter accordingly tends to remain in position as a result of its inertia and the low friction which exists between its underface and the oblique surface of the plate 41 on which said weight-head rests. Shortly before the cutting-wheel 27 comes into contact with the glass sheet 45, the cylindrical body 38 is applied percussively against the right-hand generator-line $b$ of the bore 43 of the weight-head 42. The first effect of this percussion is to reduce the kinetic energy of the moving system constituted by the rocker-arm bracket 7, the lever 5 and associated components, which in turn has the effect of reducing the force of impact of the cutting-wheel 27 on the glass sheet 45 and limits the dangers of damage to the glass at the point of impact.

The second consequence of the percussion referred to is that the weight-head 42 is abruptly displaced towards the right, thus sliding over the plate 41 until its generator-line $a$ strikes against the cylindrical body 38 once again, thus abruptly stopping the displacement of the weight-head towards the right. The moving system then receives a percussion which is conducive to the continued pivotal motion of said system in the direction of the arrow H at the moment when said system tends to slow down. In fact, the movement of the stop 31 from the stop 32 and the initial action of the restoring spring 33 tend to urge the rocker-arm bracket 7 in the direction opposite to that shown by the arrow H. As a result of its percussive action, the weight-head 42 thus restores kinetic energy to the rocker-arm bracket 7 and the work of the electromagnetic forces which are necessary to bring the core 21 into contact with the core 30 is correspondingly reduced. This percussion does not have any appreciable effect on the approach of the cutting-wheel 27 towards the glass sheet 45 by reason of the fact that it is not transmitted to the lever 5 through the intermediary of the spring 33 which is already in action and by reason of the fact that the cutting-wheel 27 is already in contact with the sheet 25.

The weight-head 42 performs a further useful function at the time of return of the machine to the inoperative position. In fact, said weight-head prevents the cutting-wheel 27 from rebounding upon the glass sheet by virtue of the following technical effect: as soon as the current which is supplied to the electromagnet 22 is cut off, the rocker-arm bracket 7 is rapidly returned to its rest position but tends to rebound towards its work position. In particular, the lever 5 tends to begin to oscillate about its pivot-pin 3, the frequency of its oscillatory movements being higher as the spring 33 is in greater tension.

However, since the generator-line $a$ of the bore 43 is in contact with the cylindrical body 38 in the work position, the weight-head 42 is rapidly driven towards the left at the time of the movement of return to the rest position. Under these conditions, when the moving system reaches its rest position for the first time, the weight-head 42 continues its movement towards the left; at the moment when the first rebound of the moving system tends to begin, the generator-line $b$ of the weight-head strikes against the cylindrical body 38. The kinetic energy of the weight-head 42, the weight and dimensions of which have been calculated accordingly, then compensates for the rebound energy of the moving system and practically reduces it to zero.

The tension of the spring 13 which serves to restore the rocker-arm bracket 7 can be regulated if necessary so as to adjust the above-mentioned rebound energy to that of the weight-head. Under these conditions, any undesirable broken-line marking of the sheet 45 by the cutting-wheel 27 is prevented. Consequently, any stray marking beyond the cutting line proper is avoided.

The combination of means provided by the invention therefore makes it possible to stop the cutting mark with a high degree of precision.

The cutting machine which is contemplated by the invention is additionally characterized by its mode of attachment to the portal frame 20 which, in the example under consideration, is essentially constituted by an I-beam which extends on each side of the glass sheet 45 and is supported at each end on bearing structures (not shown in the figures).

The fixing means which are contemplated are intended to permit of accurate positioning of the cutting machine on the portal frame 20 in order to permit the attachment of a large number of similar machines on each side of the portal frame web.

To this end, the edges of the top flange 51 of the portal frame 20 are provided with uniformly spaced teeth 53 each corresponding to the position of one cutting machine.

The bottom flange 54 of the portal frame 20 carries a recessed guide-bar 55 in which each recess or mortice 56 corresponds to the position of a cutting machine. There is fitted in each mortice a trapezoidal fixing tenon 57 which is provided with a centering nipple 58 on the top face thereof.

Each trapezoidal tenon 57 can be adjusted for height by means of a packing-piece 50 (as shown in FIG. 4) which is interposed between its underface and the mortice 56. The attachment of the tenon 57 is carried out by means of a nut 60 which is screwed on a threaded stud 70 which is integral with the tenon 57 and which passes both through the recessed guide-bar 55 and the flange 54. The packing-piece 50 is intended to compensate for the deflection to which the portal frame 20 is necessarily subjected under load if this latter is of substantial length.

There is mounted on the web of the portal frame 20 on each side thereof an insulating bar 59 provided with slots 61 in which are mounted clip-type electric contacts 62 (as shown in FIG. 5). These contacts 62 are connected by means of conductors 63 to multiconductor supply cables 64 housed in boxes 65 which are also fixed to the web of the portal frame 20.

The cutting machine itself is provided at the top portion of the wheel-carrier frame 1 with a yoke 71 and a hook with an eccentric nose 72, said hook being pivotally mounted between the cheeks of said yoke by means of a pin 73, the angular position of said hook 72 being set by means of an operating lever 74. The cheeks of the yoke 71 are separated by a channel 84, the width of which corresponds to that of the teeth 53.

There are fixed on the flanges 51 opposite to the teeth 53 receiving yokes 66 fitted with cross-pins 67 which, as will become apparent hereinafter, serve to clamp the cutting machine on the portal frame.

Connector strips 75 having a spacing which corresponds to that of the slots 61 are fixed in such a manner as to project from the edge of the wheel-carrier frame 1.

Provision is made at the bottom end of the wheel-carrier frame 1 for a recess 81 in which is fitted a V-shaped packing-piece 82 through which is formed a bore 83 corresponding in diameter to that of the nipple 58.

In order to place the cutting machine in position, it is only necessary to present it vertically in such a manner that a tooth 53 of the flange 51 should penetrate into the channel 84 formed between the two arms of the yoke 71 of the wheel-carrier frame 1. Said wheel-carrier frame is then permitted to move down while being guided by the members 53 and 84. The downward movement is continued until the nipple 58 penetrates into the bore 83. The V-shaped packing-piece 82 then comes into position astride the tenon 57. The guiding action is sufficient to ensure the automatic engagement of the strips 75 in the clip-contacts 62, thereby ensuring the connection of the electromagnet 22 to the corresponding conductor 63.

At the end of travel, the operating lever 74 is lifted so as to engage the eccentric hook 72 over the pin 67 of the yoke 66. The profile of the hook 72 is such that, by lifting the operating lever 74 in the direction of the arrow K (as shown in FIG. 2), a progressive clamping force having a downwardly directed component is accordingly applied, thereby locking the wheel-carrier frame 1 onto the bottom flange 54 of the portal frame 20 with correlative suppression of residual play.

It will be noted that the design structure of the cutting machine is such that this latter has a very small width (4 centimeters, for example). Consequently, a series of machines can be placed at a very small distance apart on a same beam, which is highly favorable to the execution of very closely spaced cutting marks. Since it is possible in addition to operate the machine irrespective of the direction $F_1$ or $F_2$ of displacement of the glass, the invention makes it possible to place machines in head-to-tail relation on each side of the portal frame 20, the transverse pitches of the machines being either displaced from one side to the other or different (for example graduations in centimeters and in inches).

In practice, it proves necessary to form a cutting-line mark at one-centimeter intervals. In the case in which the overall lateral dimension of a wheel-carrier frame 1 is four centimeters, this result can be obtained by means of two juxtaposed portal frames 20 each carrying wheel-carrier frames 1 mounted head-to-tail and displaced by one-half pitch relatively to each other on a same portal frame.

In order to obtain high precision in the determination of the beginning and end of the cutting marks, steps are taken to ensure that the response times of the different machines are substantially identical. This is achieved by constructing machines which are as similar to each other as possible and by making use of electromagnets having the same characteristics. All the machines designed in accordance with the invention can have practically identical response times of the order of $\frac{1}{20}$ of a second.

Moreover, minimum dispersion is obtained when the cutting-wheel 27 moves perpendicularly to the glass sheet 45. The conditions of pivotal attachment which are provided for the tool-holder lever 5 are precisely such that, in spite of a circular movement of displacement of the cutting-wheel, the movement of approach to the glass sheet 45 is carried out substantially at right angles, taking into account its very small distance of travel.

By virtue of the presence on the one hand of the adjustment packing-pieces 50 and on the other hand of the adjustable stop 31 which governs the angular orientation of the lever 5 with respect to the rocker-arm bracket 7, it can be ensured that, over the entire length of the portal frame 20, the planes tangent to the cutting-wheels 27 at the lowermost points of these latter are coincident and parallel to the surface of the glass sheet 45 while being located at the minimum distance from this latter which is compatible with irregularities of thickness. Chipping in the course of the cutting operation is avoided not only by means of an adequate adjustment of the pressure exerted on the cutting-wheel 27 but also by virtue of the correct and stable orientation of the lever 5 on the pin 3 which is ensured by the rigid locking of the lever 5 on said pin and the guiding of this latter by the yoke 2 which is placed beyond the yoke 9 of the rocker-arm bracket 7. Consequently, any play which may develop in the bearings produces smaller effects on the angular stability of the lever 5.

The cheeks of the yoke 2 have also been shortened as much as possible in order to eliminate bending effects.

It is apparent that the invention is not limited to the form of execution which is illustrated and that a number of different alternative forms may be contemplated. Thus, it would be feasible to modify the structure of the electromagnetic control system.

Moreover, although the means hereinabove described are preferred, it would also be possible to mount the cutting-wheel 27 in a pivotal manner on the lever 5 so that the cutting-wheel is thus automatically oriented under the action of the movements of the glass. The cutting-wheel itself could be attached to the lever 5 by means of a small yoke which can readily be removed. If so required, a device for lubricating the cutting-wheel or the glass sheet could also be added to the wheel-carrier frame 1.

What we claim is:

1. A machine for cutting sheet-glass comprising a wheel-carrier frame on which is pivotally mounted a tool-holder lever which is urged elastically towards a stop position and an electromagnetic control system for actuating said tool-holder lever, characterized in that the wheel-carrier frame carries a rocker-arm bracket which is pivotally mounted coaxially with said tool-holder lever and urged elastically towards a stop position defined with respect to said wheel-carrier frame, the tool-holder lever being in turn urged elastically towards a stop position defined with respect to said rocker-arm bracket which is subjected to the action of said electromagnetic control system.

2. A machine in accordance with claim 1, characterized in that the rocker-arm bracket consists of an L-shaped member which is pivotally mounted on the wheel-carrier frame in the vicinity of its apex.

3. A machine in accordance with claim 2, characterized in that one of the arms of the L-shaped member extends substantially along the wheel-carrier frame and is returned towards this latter by a spring which is attached to the wheel-carrier frame, the other arm of said L-shaped member being connected by means of a link-arm to the moving core of the electromagnetic control system.

4. A machine in accordance with claim 1, characterized in that the tool-holder lever is pivotally mounted on a pin which is mounted in a yoke of the wheel-carrier frame, the rocker-arm bracket being in turn pivotally mounted on said pin by means of another yoke which is inserted between the yoke of said wheel-carrier frame and said tool-holder lever.

5. A machine in accordance with claim 1, characterized in that it comprises an adjustable stop which serves to modify the position in which the tool-holder lever is applied against the rocker-arm bracket.

6. A machine in accordance with claim 1, characterized in that the tool-holder lever is urged towards the rocker-arm bracket by an adjustable-tension restoring spring which is attached to one end of said rocker-arm bracket.

7. A machine in accordance with claim 1, characterized in that the moment of elastic restoring of the tool-holder lever towards the rocker-arm bracket exceeds to a substantial extent the moment of restoring of the rocker-arm bracket towards the wheel-carrier frame.

8. A machine in accordance with claim 1, characterized in that one of the arms of the rocker-arm bracket carries an annular weight-head which is mounted with radial play on said arm.

9. A machine in accordance with claim 1, characterized in that the tool-holder lever projects relatively to the wheel-carrier frame on the side remote from a support frame on which said wheel-carrier frame is supported.

10. A machine in accordance with claim 1, characterized in that, in the rest position, the horizontal tangent plane at the lowest point of the cutting tool is located at a short distance from the horizontal tangent plane which passes through the pivotal axis which is common to the lever and to the rocker-arm bracket.

11. A machine in accordance with claim 1, characterized in that the wheel-carrier frame is constituted by a flat plate of substantially triangular configuration which is parallel to the direction of progression of the glass sheet, said plate being provided with a housing in which is mounted an operating electromagnet and with a projecting portion which extends towards the glass sheet on the side remote from the points at which said plate is attached to the support frame.

12. A machine in accordance with claim 1, characterized in that the wheel-carrier frame is provided with members for fixing it on edge on a transverse portal frame which serves as a support, the tool-holder lever being pivotally mounted on said wheel-carrier frame by means of a pin which is located on the side remote from said portal frame.

13. A machine in accordance with claim 12, characterized in that the members for fixing the wheel-carrier frame comprise means for assembly by tenons and mortices and clamping members which permit the interlocking of said means.

14. A machine in accordance with claim 12, characterized in that the wheel-carrier frame comprises inter-engageable connecting terminals for connecting the electromagnet circuit to a supply circuit arranged on the portal frame.

15. A machine in accordance with claim 1, characterized in that the tool-holder lever is lowered towards the glass sheet by means of the electromagnetic control system when the electromagnet of said system is energized.

References Cited

UNITED STATES PATENTS

| | | | |
|---|---|---|---|
| 3,274,390 | 9/1966 | Umbel | 225—96.5 X |
| 3,280,677 | 10/1966 | Grzymislawski | 83—12 X |
| 3,399,586 | 9/1968 | Insolio et al. | 83—12 X |

FRANK T. YOST, Primary Examiner

U.S. Cl. X.R.

83—490, 564, 575, 582, 589; 225—96